United States Patent [19]

Foskett

[11] Patent Number: 5,075,979
[45] Date of Patent: Dec. 31, 1991

[54] AERODYNAMIC CALIPER GAUGE

[75] Inventor: Anthony D. Foskett, San Jose, Calif.

[73] Assignee: Measurex Corporation, Cupertino, Calif.

[21] Appl. No.: 531,123

[22] Filed: May 31, 1990

[51] Int. Cl.$^5$ ............................................... G01B 3/00
[52] U.S. Cl. ................................... 33/501.02; 33/832; 324/231
[58] Field of Search ................... 324/229, 230, 231; 33/501.02, 501.03, 834, DIG. 1

[56] References Cited

U.S. PATENT DOCUMENTS

| | | | |
|---|---|---|---|
| 2,665,333 | 1/1954 | Dunipace et al. | 324/34 |
| 3,164,981 | 1/1965 | Knobel | 33/501.02 |
| 3,166,172 | 1/1965 | Kelsey et al. | 192/127 |
| 3,194,055 | 7/1965 | Knobel | 73/37.5 |
| 3,249,860 | 5/1966 | Huggins | 324/231 |
| 3,357,241 | 12/1967 | King | 73/159 |
| 3,528,002 | 9/1970 | Dunlavey | 324/231 |
| 3,818,327 | 6/1974 | Alexander | 324/34 |
| 3,828,248 | 8/1974 | Wennerberg | 324/34 |
| 3,855,524 | 12/1974 | Crawford | 324/231 |
| 4,041,378 | 8/1977 | Ott | 324/34 |
| 4,107,606 | 8/1978 | Typpo et al. | 324/229 |
| 4,107,847 | 8/1978 | Typpo et al. | 33/147 |
| 4,134,211 | 1/1979 | Typpo et al. | 33/147 |
| 4,271,699 | 6/1981 | Williamson | 73/159 |
| 4,292,838 | 10/1981 | Larsen | 73/37.7 |
| 4,574,634 | 3/1986 | Pappano | 73/597 |
| 4,587,849 | 5/1986 | Gross | 73/644 |
| 4,661,774 | 4/1987 | Montgomery | 324/231 |
| 4,739,249 | 4/1988 | Nyfors et al. | 324/58.5 |
| 4,901,445 | 2/1990 | Boissevain et al. | 33/501.02 |

FOREIGN PATENT DOCUMENTS 45373  2/1962  Poland ............................. 324/229

OTHER PUBLICATIONS

Author unknown, "What's the Plus in MicroPlus?, The most detailed profiles—ever," Mar. 1989 issue of *Pulp and Paper,* p. 71, place of publication unknown.
Author unknown, "Microscan Caliper Sensor (Contacting)," publication date unknown, bears 1989 U.S. copyright date, place of publication unknown.

*Primary Examiner*—William A. Cuchlinski, Jr.
*Assistant Examiner*—Alvin Wirthlin
*Attorney, Agent, or Firm*—Spensley Horn Jubas Lubitz

[57] ABSTRACT

A contacting caliper gauge measures the thickness of a moving sheet material. The gauge has two sheet contacting pads, one on either side of the sheet. At least one sheet contacting pad of the caliper gauge is aerodynamically designed to limit and/or reduce the tendency of boundary layer air travelling with the sheet to raise the sheet contacting pad off of the sheet surface. The caliper gauge also includes an electromagnetic proximity sensing device for determining the distance between the caliper pads, and thereby the sheet thickness. The gauge includes a caliper pad having an electromagnetic core having two pole faces mounted to that portion of the caliper pad remaining in closest proximity to the moving sheet surface. In on embodiment, the caliper pad has a vacuum notch which pulls the rear half of the pad, and in particular the rear end of the pad, in close proximity to the moving sheet. In this embodiment, the two pole faces of the electromagnetic core are located near the rear end of the pad and straddle the vacuum notch.

31 Claims, 2 Drawing Sheets

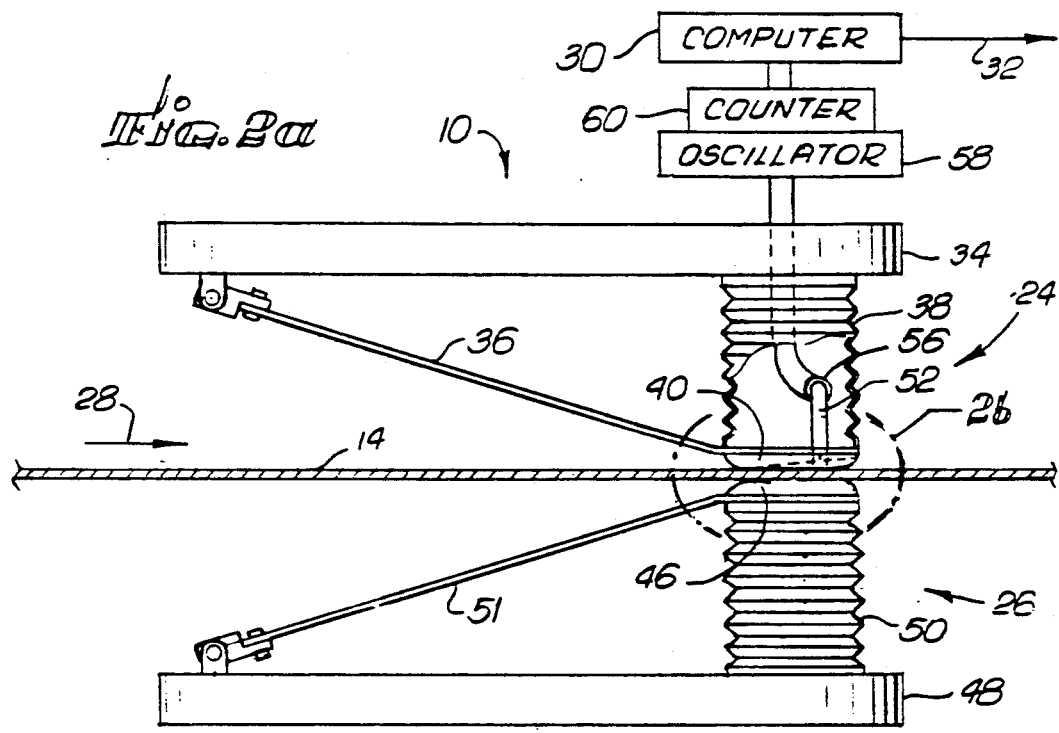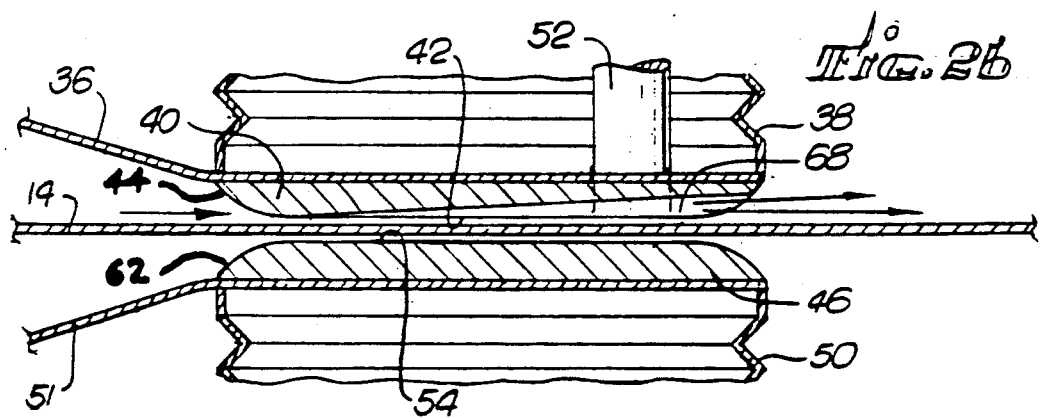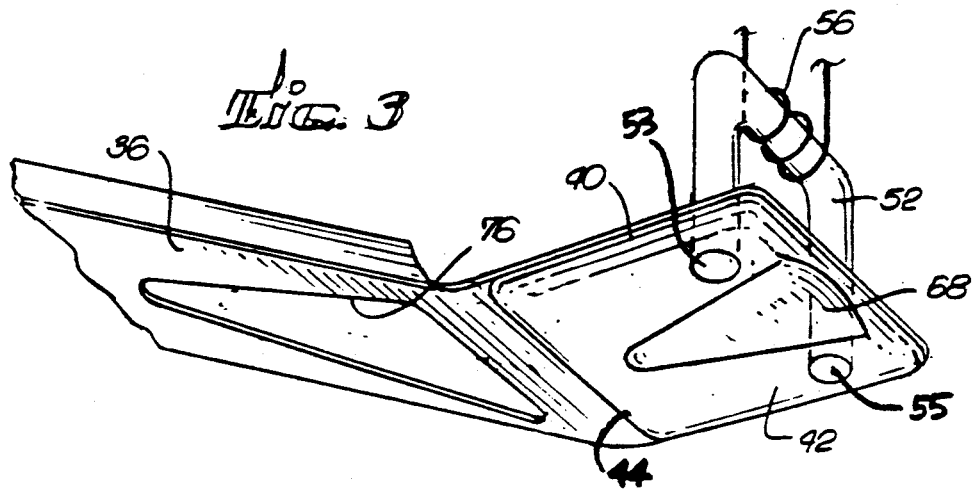

AERODYNAMIC CALIPER GAUGE

BACKGROUND OF THE INVENTION

The present invention relates to an apparatus for measuring a physical property, such as thickness of a sheet material. More particularly, the invention relates to a caliper gauge for measuring the thickness of a sheet of paper which is in the process of being manufactured by a papermaking machine and, therefore, is moving at a high rate of speed through the caliper gauge.

Various types of caliper gauges are known in sensor technology and are used for measuring the thickness of rapidly moving sheet material. One type of caliper gauge is called a "contacting caliper gauge." Contacting caliper gauges typically have two opposing pads which are forced into contact with opposite sides of a sheet. The distance between the pads is measured and directly relates to the sheet thickness or "caliper."

Under some situations, contacting caliper gauges may suffer from certain shortcomings. For example, U.S. paper manufacturers have formed a association (TAPPI) to promote uniform standards for the paper industry. Since paper is somewhat compressible, the TAPPI standard for measuring paper sheet caliper requires that the measurement be based upon results obtained from a contacting caliper gauge having opposing pads which exert a certain specified pressure on the paper sheet. Unfortunately, the requirement that the caliper gauge contact the sheet under pressure poses a problem when measuring the caliper of particularly lightweight, thin or weak paper. Under the required pressure, the sheet contacting pads have a tendency to tear such sheets. This is particularly true when a sheet imperfection causes an abrupt increase in thickness.

Certain prior caliper gauge pads are essentially disk-shaped, with smooth, rounded pad edges to avoid snagging imperfections in the sheet. These caliper pad designs may exhibit limitations in modern paper mills, where papermaking process speeds can approach 60 mph. The rapidly moving sheet drags with it a boundary layer of air, near the surface of the sheet, at approximately the same speed as the sheet. As the sheet passes between the opposing caliper pads, the boundary layer of air on both sides of the sheet creates a lifting effect, which tends to force the pads away from the sheet surface. Thus, at high paper speeds, the pads of a "contacting" caliper gauge may actually fail to contact the sheet. However, as previously mentioned, conventional caliper gauges determine sheet thickness based on the measured distance between opposing pads. Thus, the lifting effect can induce an erroneous caliper measurement by making the sheet appear thicker than it actually is. The lifting effect increases as the sheet speed, and hence the speed of the boundary layer air, increases.

The force on the contacting pads can be increased to overcome the lifting effect, but if the process speed is reduced significantly, the lifting effect of the boundary air provides less opposition to the force of the contacting pads. Thus, when process speed is reduced, the pressure of the contacting pads on the sheet increases, increasing the tendency of the pads to tear thin or lightweight papers.

Another caliper designer recognized that he must consider the aerodynamic design of the caliper pads if the pads were to be maintained on or near the sheet surface with relatively little external force. This previous caliper gauge having aerodynamically designed caliper pads is disclosed in the U.S. Pat. No. 4,901,445 to Matthew G. Boissevain et al., assigned to Measurex Corporation which is incorporated herein by reference.

SUMMARY OF THE INVENTION

The present invention relates to a caliper gauge for measuring the thickness of a sheet while it moves rapidly from the front to the rear of the gauge. The gauge comprises upper and lower pads disposed adjacent to, respectively, the upper and lower surfaces of the sheet being measured. The pads are held opposite each other, and each pad is forced against the sheet by an elastic extendible member, such as an inflated bellow. Because the elastic members place the pads in contact with the rapidly moving sheet, it will usually be desirable to make the pads out of abrasion resistant material.

Each pad has a sheet contacting surface disposed substantially parallel to the sheet. However, the sheet contacting surface is preferably rounded near the front portion of the gauge so that the opposing pads together form a substantially V-shaped guide for the entrance of the sheet between the pads. This reduces the probability of tearing the sheet.

As previously explained, the boundary layer of air will tend to create an air bearing which raises each pad off of the sheet surface. However, according to the present invention, the tendency of the pads to fly off of the sheet is reduced or eliminated by providing a notch in one or both of the opposing pads. This notch is formed in the sheet contacting surface of a pad and is shaped so that the notch is narrower, and/or more shallow, toward the front portion of the pad and widens and/or deepens toward the back of the pad. The notch further preferably has its widest and/or deepest part at the back surface of the pad. Such a tapered notch in the sheet contacting surface of the pad requires the boundary layer of air rushing between the pad and the sheet to fill an ever increasing volume as it moves from the front to the rear of the pad, thereby creating a partial vacuum in the notch.

The partial vacuum created in the notch tends to force the pad against the sheet. The vacuum is proportional to the sheet speed. The lift caused by the boundary layer of air is also proportional to sheet speed. Thus, by properly sizing and shaping the notch, the partial vacuum created in the notch can be made to substantially counteract the speed dependent lifting force of the boundary layer air over a wide range of sheet speeds. Accordingly, the sheet contacting pads of the present invention either remain in contact with the sheet surface, or fly only a very small distance off of the sheet over a broad range of sheet speeds. Thus, by measuring the distance between the opposing pads, the present invention provides an essentially speed-independent sheet caliper measurement which need not be corrected for the flying of the pads above the sheet surface.

The caliper gauge is equipped with an electromagnetic proximity sensing circuit for measuring the distance between the opposing pads of the gauge. The circuit includes an electromagnetic core mounted to a caliper pad having an aerodynamically designed sheet contacting surface. The opposing caliper pad is formed of a magnetically susceptible abrasion resistant material. A coil surrounding the core of the electromagnet acts as an inductor to an oscillator circuit. When the sheet thickness changes, the magnetically susceptible pad will move either toward or away from the coil. This movement will change the inductance of the coil and therefore the resonant frequency of the oscillator circuit. A frequency counter is operatively coupled to the oscillator to determine its resonant frequency. The frequency counter sends a signal indicative of the resonant frequency to a computer which then determines the sheet thickness based on the resonant frequency.

The ability of the caliper gauge to accurately measure thin paper is dependent upon the sum of the distances of the electromagnetic pole faces to the magnetically susceptible caliper pad. Thus, the electromagnet is preferably disposed so that its pole faces are mounted to that portion of the caliper pad remaining in closest proximity to the sheet surface. When the caliper pad has a vacuum notch located on the sheet contacting surface, the rear half of the caliper pad, and in particular the rear end of the pad, remains closest to the sheet surface. In this embodiment, the electromagnetic pole faces are preferably mounted near the rear edge of the pad, transverse to the direction of sheet travel, and straddle the vacuum notch.

BRIEF DESCRIPTION OF THE DRAWINGS

FIG. 2a is a schematic cross-sectional view of one embodiment of the caliper gauge of the present invention.

FIG. 2b is an enlarged view of the caliper pads of FIG. 2a.

FIG. 3 illustrates, in perspective, the aerodynamically designed caliper pad of FIGS. 2a and 2b, an electromagnetic core and its position with respect to the caliper pad.

DETAILED DESCRIPTION OF THE DRAWINGS

Figure 1:
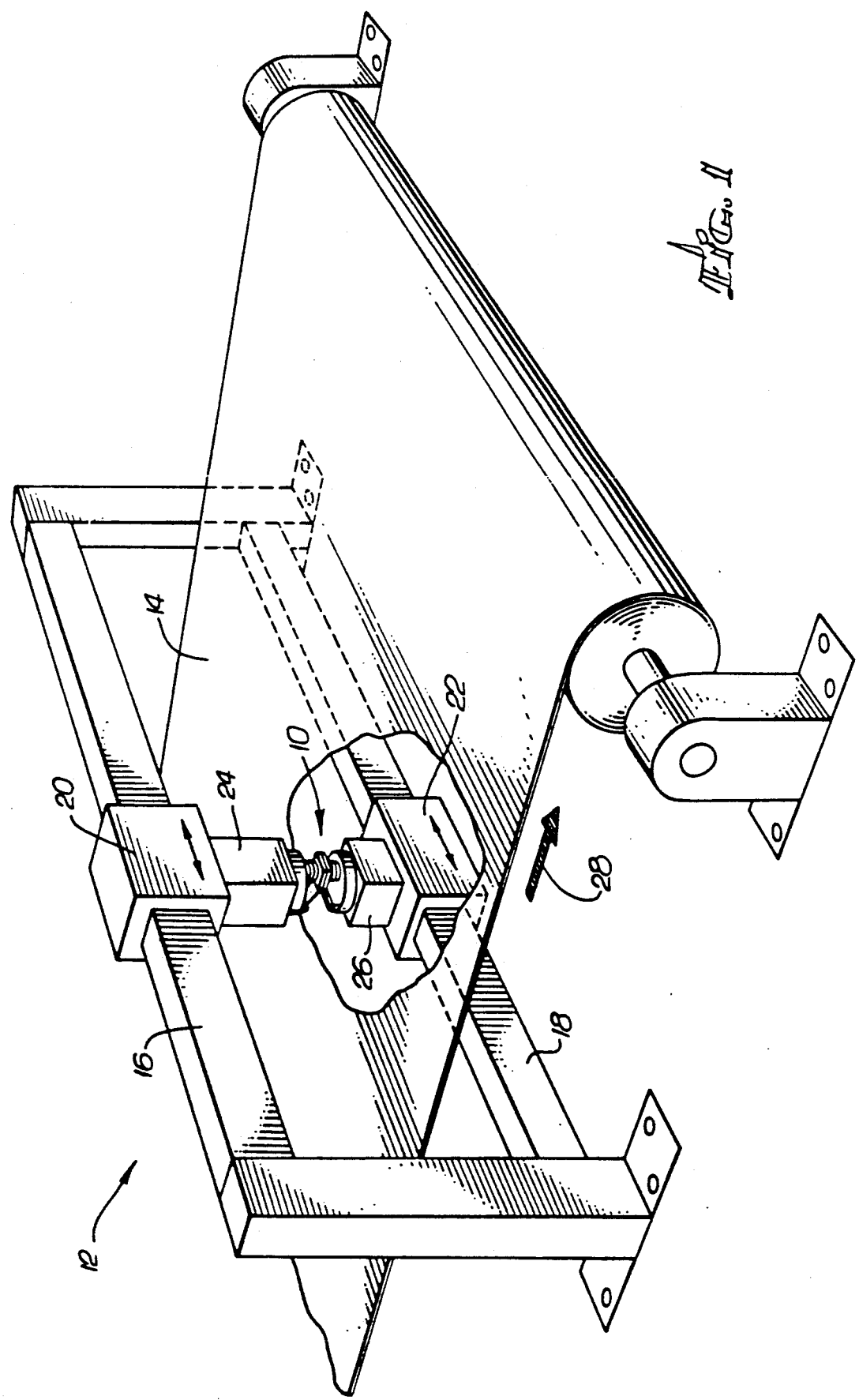
FIG. 1 is a simplified perspective view of a sheet scanning station having a caliper gauge mounted thereto for measuring sheet thickness immediately before the sheet is collected on a reel. Part of the sheet is removed to better illustrate the lower opposing portion of the caliper gauge.

FIG. 1 illustrates one embodiment of a sheet thickness or caliper gauge 10 of the present invention mounted to a scanner 12 which scans back and forth across a longitudinally moving paper sheet 14 being produced by a papermaking machine (not shown). The scanner 12 is of a now conventional type, such as that described in the commonly assigned U.S. Pat. No. 3,621,259 to Mathew G. Boissevain. This patent is incorporated herein by reference.

The scanner 12 consists generally of a framework having a pair of spaced upper 16 and lower 18 beams and carriages 20, 22 which move back and forth across the beams 16, 18 in opposed relationship. The upper carriage 20 carries the upper head 24 of the caliper gauge 10, while the lower carriage 22 carries the lower head 26 of the caliper gauge 10. The two carriages 20, 22, and thus the two caliper heads 24, 26, are juxtaposed to provide a gap therebetween through which the paper sheet 14 freely moves. Although FIG. 1 merely shows the caliper gauge 10 used to measure paper thickness, the carriages 20, 22 would typically also carry additional devices for measuring various other physical characteristics of the paper sheet 14.

FIG. 2a illustrates, in partial cross-section, the upper and lower heads 24, 26 of the present caliper gauge 10. The paper sheet 14 moves rapidly between the upper and lower heads 24, 26 in the "machine direction," that is, the direction shown by the arrow 28. Thus, the paper sheet 14 moves from the front to the rear of the gauge 10.

As the caliper gauge 10 scans back and forth across the paper sheet 14, signals from the gauge 10 are sent, via signal processing circuitry, to a process control computer 30. The computer 30 uses the signals to compute a sheet thickness profile. The sheet thickness profile is then used by the computer 30 to adjust various sheet processing parameters to create a sheet having a desired thickness profile. FIG. 2a illustrates that output signals 32 from the computer 30 may be used to adjust various devices (not shown) on the papermaking machine to achieve the desired thickness profile.

The upper head 24 of the caliper gauge 10 includes a sturdy, relatively massive base 34 mounted to the upper carriage 20. One end of a support arm 36 is hinged at the front of this base 34. The other end of the support arm is hinged at the bellow 38. The bellow 38 connects the other end of the support arm 36 to the base 34 near the back of the gauge 10. The bellow 38 is disposed substantially perpendicular to the paper sheet 14. A sheet contacting pad 40 is attached to the distal end of the bellow 38. As shown in FIG. 2b, this pad 40 has a sheet contacting surface 42 which is substantially parallel to the sheet 14 near the back of the gauge 10, but which has a rounded portion 44 at the front of the pad 40 to guide the paper 14 between the pads 40, 46. When pressurized the bellow 38 forces the pad 40 toward contact with the upper surface of the sheet 14.

The lower head 26 is similar in mechanical construction to the upper head 24. Like the upper head 24, the lower head 26 includes a second sturdy, relatively massive base 48, a second sheet contacting pad 46 and a second bellow 50. Each of these elements are connected in substantially the same manner as that described above for the upper head 24, except, of course, that the lower base 48 is mounted to the lower carriage 22.

The upper and the lower heads 24, 26 are positioned such that the upper bellow 38 and the lower bellow 50 are in a substantially linear opposing relationship. Thus, during operation of the gauge 10, the upper pad 40 and the lower pad 46 would be disposed in substantial opposing relationship on opposite sides of the sheet 14.

In general, any extendible means could be used in place of each bellow. However, a bellow is preferred because the electromagnetic circuit used to measure the thickness of the sheet material may be placed within the hollow interior of the bellow. One such circuit is fully described in the commonly assigned U.S. Pat. No. 3,828,248 to Gunnar Wennerberg, which is incorporated herein by reference. Briefly, however, the caliper gauge 10 is equipped with an electromagnetic proximity sensing device for accurately measuring the distance between the opposing pads 40, 46. This device includes an electromagnetic core 52 mounted to the upper pad 40 and disposed within the upper bellow 38. The electromagnetic core 52 is disposed so that its two pole faces 53, 55 are mounted to that portion of the upper pad 40 which remains in closest proximity with the sheet 14. When the upper pad 40 has a vacuum notch 68, the electromagnetic core 52 is disposed so that its two pole faces 53, 55 are located in the rear half of the upper pad 40. The two pole faces 53, 55 are preferably mounted transverse to the direction of sheet travel and straddle the vacuum notch 68. Favorable results have been obtained when the two pole faces 53, 55 are located near the rear edge of the upper pad 40, where the pad 40 having a vacuum notch 68 remains closest to the sheet surface.

The upper pad 40 is preferably formed of a highly abrasion resistant, non-magnetic material, such as sapphire. The lower pad 46 is formed of a magnetically susceptible abrasion resistant material, such as ferrite, preferably coated with sapphire or diamond. The pads 40, 46 are preferably abrasion resistant to avoid excessive wear caused by the friction between the moving sheet 14 and the sheet contacting surfaces 42, 54 of the pads 40, 46.

The coil 56 surrounding the electromagnetic core 52 may be electrically connected to an oscillator circuit 58 and used as the inductance of that circuit 58. Thus, movement due to sheet thickness changes of the magnetically susceptible ferrite pad 46 toward and away from the coil 56 modifies the inductance of the coil 56 and hence the resonant frequency of the oscillator circuit 58. A frequency counter 60 is operatively coupled to the oscillator 58 to determine its resonant frequency. The counter 60 then sends a signal to the computer 30 indicative of this resonant frequency. The computer 30 computes the distance between the electromagnetic core 52 and the ferrite pad 46, and hence sheet thickness, based upon this resonant frequency.

It is particularly preferred that the upper pad 40 be abrasion resistant. This is because, as illustrated in FIG. 2b, the electromagnetic core 52 is preferably recessed within the pad 40, so that the pole faces 53, 55 are in close proximity to the sheet contacting surface 42 of the pad 40. The proximity sensing circuits are calibrated with the unworn pad. Therefore, if the sheet contacting surface 42 of the pad 40 is worn down, the pole faces 53, 55 of the electromagnetic core 52 will move closer to the sheet 14 and produce an erroneous thickness measurement or tear the sheet.

There are a number of advantages to the gauge 10 of the present invention which make it well suited to the measurement of the thickness of thin, weak or otherwise easily damaged material, such as tissue paper.

One advantage is that the only elements of gauge 10 which respond to sheet thickness variations are the bellows 38, 50, through contraction or elongation, the arms 36, 51, the pads 40, 46 and the electromagnetic core 52 which move with the bellows 38, 50. The bellows 38, 50 are much less massive than the upper 34 and lower 48 bases. Therefore, the lighter, less massive and therefore more easily movable bellows 38, 50 reduce the likelihood of tears during the measurement process when there is a rapid thickness variation in the sheet 14, such as might occur at a sheet imperfection. Also, the arms 36, 51 are preferably made of a strong, lightweight material, such as mylar, to further reduce the total mass of the moving parts of the gauge 10.

Another advantage of the gauge 10 is the combination of the opposing rounded portions 44, 62 of the upper and lower pads 40, 46. Together, these rounded portions 44, 62 form a V-shaped guide for the entrance of the sheet 14 between the pads 40, 46. As shown in FIG. 3 and discussed more fully below, the pads are preferably rectangular. Therefore, the V-shaped rounded rectangular front portions 44, 62 distribute force evenly over the entire width of the pads 40, 46. This even distribution of pressure over the entire width of the pads 40, 46 decreases localized forces between the sheet 14 and the pads 40, 46, thereby further reducing the probability of tearing the sheet 14. Further, as described in greater detail below, the aerodynamic action of the pad minimizes and/or completely counteracts the lifting action of the air bearing effect previously discussed.

FIG. 3 illustrates one aerodynamic design for pad 40. The pad 40 may be 0.75 inches wide measured along the "cross-direction" perpendicular to the direction of sheet travel, by 0.80 inches along the machine direction, by 0.03 inches thick. The front of the pad 40 preferably has a rounded surface 44 having a radius of 0.25 inches. The central and back portions of the sheet contacting pad 40 surface have a vacuum notch 68 formed therein.

As previously discussed, a boundary layer of air travels with the sheet 14 as the sheet 14 passes between the two opposing pads 40, 46. This boundary layer of air will tend to lift the pads 40, 46 off the surfaces of the sheet 14, thereby producing a false sheet thickness measurement. With the aerodynamic pad design of FIG. 3, as the sheet speed is increased, the boundary layer of air first forces itself between the pad 40 and the sheet 14 near the front portion of the pad 40, thereby tending to raise the pad 40 off of the surface of the sheet 14. However, as the boundary layer reaches the vacuum notch 68 and continues to travel toward the back of the pad 40, it is forced to fill an ever increasing volume (see e.g., FIG. 2b), thereby creating a partial vacuum within the notch 68 between the pad 40 and the sheet 14. This partial vacuum pulls the pad 40 back toward the sheet 14, thus counteracting the air bearing effect. Moreover, as the speed of the sheet 14, and hence the air bearing effect increases, the partial vacuum formed in the vacuum notch 68 also increases, thereby tending to cancel the increasingly strong air bearing effect. The net result is that, with the pad design of FIG. 3, the tendency for the pad 40 to fly off of the sheet will be reduced or eliminated over a wide range of paper speeds. In the illustrated embodiment of FIG. 3, the vacuum notch 68 is 0.60 inches long and increases to 0.34 inches wide and is 0.010 inches deep at the cross directional center of the rear surface of the pad 40. However, the dimensions of the notch 68 and pad 40 may be adjusted for use in different manufacturing situations to provide the desired pressure between opposing pads 40, 46. All else being equal, a wider and/or deeper vacuum notch will provide a greater partial vacuum than a narrower, more shallow vacuum notch. In fact, the "notch" may actually extend at all points across the entire width of the pad so that the entire rear portion of the sheet contacting pad surface is inclined away from the sheet surface. Whatever dimensions are chosen, all pad surfaces should be smooth to avoid build-up of paper dust which could cause an erroneous measurement.

We have found that a appropriate method of creating the vacuum notch 68 is by grinding the pad 40 with a grinding wheel having an 1.5 inch diameter. The grinding wheel is oriented with its axis of rotation located parallel to the machine-direction axis of the pad 40 and about 5/6 degree from a plane parallel to the face of the pad 40. Then the grinding wheel is moved from one end of the pad 40 to the other so that the notch 68 is formed having the shape of a section of a cylinder.

Pads of identical design may, if desired, be used on both the upper 24 and lower 26 heads of the caliper gauge 10. However, in certain situations, it may only be necessary to use the pad design of FIG. 3 on one of the two heads 24, 26. The opposing head may simply be formed with a pad 46 having a flat sheet contacting surface, as shown in FIGS. 2a and 2b. These figures illustrate a caliper gauge 10 where only the upper head 24 utilizes a pad 40 having a vacuum notch 68. Despite the fact that a vacuum notch 68 is formed in only one of the two opposing pads, the partial vacuum created on one side of the sheet 14 by the vacuum notch 68 will nevertheless also cause a low pressure region on the opposite side of the sheet 14. This low pressure region on the opposite side of the sheet 14 also tends to force the opposing flat surfaced pad 46 toward the sheet. Thus, although only a single pad need be formed with an aerodynamic vacuum notch 68, the resulting partial vacuum will force both pads 40, 46 toward contact with the sheet 14.

The low pressure region between the sheet 14 and the flat surfaced pad 46 may be caused by one or both of the following effects. First, if the sheet 14 is porous, like many paper sheets, the boundary layer air between the sheet 14 and the flat surfaced pad 46 will be sucked through the porous sheet 14 toward the vacuum notch 68, thereby causing a partial vacuum in the space between the sheet 14 and the lower pad 46. Alternatively, or in addition, even if the sheet 14 is not porous, the sheet 14 will tend to be sucked into, and therefore conform to the shape of the vacuum notch 68. Thus, the sheet 14 itself will obtain an aerodynamic shape which will create a partial vacuum adjacent the flat surfaced opposing lower pad 46. In either event, both pads 40, 46 will be drawn toward the sheet 14 by an aerodynamically created partial vacuum.

Whatever pad design is utilized, the magnetically susceptible pad 46 should be sufficiently broad in lateral extent so that slight lateral misalignments between the upper and lower heads 24, 26 will not induce a falsely large caliper measurement.

In operation, the sheet 14 is threaded between the opposing caliper heads 24, 26 and the process control computer 30 instructs the scanning station 12 to begin scanning the caliper gauge 10 back and forth along the cross-direction of the sheet 14. The bellows 38, 50 are pressurized to place the pads in forcible opposing contact with the sheet 14. A pressure of about 2-4 inches of water (gauge) in 1 inch diameter bellows will provide sufficient pressure to maintain the pads 40, 46 of FIG. 2a in contact or in very close proximity (less than about 2 microns) to the sheet 14 over a relatively wide range of sheet speeds. Of course, higher bellows pressures may be used with stronger, less easily damaged sheets. Sheet caliper measurements are performed by the proximity sensing electronics, as discussed above.

As the sheet speed increases, a rapidly moving boundary layer of air will form near the opposing sheet surfaces and attempt to lift the pads 40, 46 away from the sheet 14. The aerodynamically designed pads of the present invention will counter this effect and in particular will counter the effect near the rear end of caliper pad 40 where the electromagnetic pole faces 53, 55 may be located. However, air pressure may also build up on the inner front surfaces of the upper 36 and lower 51 arms. Such pressure would also tend to raise the pads 40, 46 off of the sheet 14. However, the arms 36, 51 are designed with vent holes 76 (FIG. 3) which allow the air to flow through the arms 36, 51, thus relieving the pressure and, again, minimizing the tendency of the pads 40, 46 to fly off of the sheet surfaces. These vent holes 76 also reduce the total weight of the moving parts of the caliper gauge 10 and, therefore, make it more responsive to rapid changes in sheet thickness with reduced risk of tearing the sheet.

A preferred embodiment of the present invention has been described. Nevertheless, it will be understood that various modifications may be made without departing from the spirit and scope of the invention. For example, the pad illustrated in FIG. 3 may be used with a single caliper head, or on both opposing caliper heads. Vacuum notches of varying sizes and shapes are also within the scope of the invention. The present invention is also not limited to use with paper sheet. Other sheet material may be used. Furthermore, physical characteristics of the sheet other than thickness may be measured with the disclosed invention. Furthermore, the electromagnetic core may be disposed so that each pole face is located in whatever portion of the pad remains closest to the moving sheet. When the caliper pad has a vacuum notch that portion of the pad is typically near the rear edge, however, other caliper pad shapes may result in another portion of the pad remaining closest to the sheet. These embodiments having electromagnetic core faces mounted within the caliper pad in a location other than the rear half of the pad are also within the scope of the present invention. Thus, the present invention is not limited to the preferred embodiments described herein, but may be altered in a variety of ways which will be apparent to persons skilled in the art.

I claim:

1. A caliper gauge for measuring a physical property of a moving sheet, the gauge comprising:
   a first sheet contact pad, the first pad having a front end and a rear end, a first side, the first side including a surface adapted for slidable contact with the sheet moving by the first pad from the front end to the rear end; and
   an electromagnetic core having two pole faces, the core being disposed so that the pole faces are within the rear half of the first pad and are maintained in close proximity to the moving sheet.

2. The caliper gauge of claim 1, wherein the first side of the first pad further includes a rounded surface at the rear end of the first pad extending across the width of the first pad.

3. The caliper gauge of claim 1, wherein the electromagnetic core is mounted to the first pad so that each pole face is mounted near the rear end of the first pad so that each pole face is maintained in close proximity to the moving sheet.

4. The caliper gauge of claim 1, wherein the electromagnetic core is mounted so that each pole face is substantially flush to the sheet contacting surface of the first pad.

5. The caliper gauge of claim 1, wherein the electromagnetic core is substantially U-shaped.

6. The caliper gauge of claim 1, wherein the first side of the first pad further includes a rounded surface at the front end of the first pad extending across the width of the first pad.

7. The caliper gauge of claim 1, wherein the first side of the first pad further includes a rounded surface at the rear end of the first pad curving away from the sheet contacting surface, the rounded surface extending across the width of the first pad.

8. The caliper gauge of claim 1, further comprising:
   a first base;
   a first extendible member having one end connected to the base; and
   wherein the first pad is mounted to the end of the extendible member opposite the first base, the first pad having the first side opposite the first base.

9. The caliper gauge of claim 8, further comprising a first arm, one end of the first arm being connected to the first bas and the other end of the first arm being connected to the first pad.

10. The caliper gauge of claim 9, wherein the first arm includes a vent hole which allows air to flow through the first arm.

11. The caliper gauge of claim 8, further comprising:
    a second base;
    a second extendible member having one end connected to the second base; and
    a second pad being magnetically susceptible and mounted to the end of the second extendible member opposite the second base, the second pad having a second side opposite the second base and a front and rear end, wherein the second side includes a surface for contacting the moving sheet.

12. The caliper gauge of claim 11, wherein the second side further includes a notch extending form the rear end of the second pad to a location along the second side spaced from the rear end of the second pad.

13. The caliper gauge of claim 11, wherein the second side of the second pad further includes a rounded surface at the front end of the second pad extending across the width of the second pad.

14. The caliper gauge of claim 13, further comprising electromagnetic proximity sensing means for determining a distance between the first pad and the second pad.

15. The caliper gauge of claim 11, wherein the second side of the second pad further includes a rounded surface at the rear end of the second pad curving away from the sheet contacting surface, the rounded surface extending across the width of the second pad.

16. A caliper gauge for measuring a physical property of a moving sheet, the gauge comprising:
    a first sheet contact pad, the first pad having a front end and a rear end, a first side, each side having a front and a rear half, the first side including a surface adapted for slidable contact with the sheet moving by the first pad from the front end to the rear end and a notch extending from the rear end to a location along the first side spaced from the rear end; and
    an electromagnetic core having two pole faces, the core being disposed so that the pole faces straddle the notch of the first pad and are mounted within the rear half of the first pad.

17. The caliper gauge of claim 16, wherein the first side of the first pad further includes a rounded surface at the rear end of the first pad extending across the width of the firs pad.

18. The caliper gauge of claim 16, wherein the electromagnetic core is mounted to the first pad so that each pole face is mounted near the rear end of the first pad so that each pole face is maintained in close proximity to the moving sheet.

19. The caliper gauge of claim 16, wherein the notch increases in size toward the rear end of the first pad.

20. The caliper gauge of claim 16, wherein the electromagnetic core is mounted so that each pole face is substantially flush to the sheet contacting surface of the first pad.

21. The caliper gauge of claim 16, wherein the electromagnetic core is substantially U-shaped.

22. The caliper gauge of claim 16, wherein the first side of the first pad further includes a rounded surface at the front end of the first pad extending across the width of the first pad.

23. The caliper gauge of claim 16, wherein the first side of the first pad further includes a rounded surface at the rear end of the first pad curving away from the sheet contacting surface, the rounded surface extending across the width of the first pad.

24. The caliper gauge of claim 16, further comprising:
    a first base;
    a first extendible member having one end connected to the base; and
    wherein the first pad is mounted to the end of the extendible member opposite the first base, the first pad having the first side opposite the first base.

25. The caliper gauge of claim 24, further comprising a first arm, one end of the first arm being connected to the first base and the other end of the first arm being connected to the first pad.

26. The caliper gauge of claim 25, wherein the first arm includes a vent hole which allows air to flow through the first arm.

27. The caliper gauge of claim 24, further comprising:
    a second base;
    a second extendible member having one end connected to the second base; and
    a second pad being magnetically susceptible and mounted to the end of the second extendible member opposite the second base, the second pad having a second side opposite the second base and a front and rear end, wherein the second side includes a surface for contacting the moving sheet.

28. The caliper gauge of claim 27, wherein the second side further includes a notch extending from the rear end of the second pad to a location along the second side spaced from the rear end of the second pad.

29. The caliper gauge of claim 27, wherein the second side of the second pad further includes a rounded surface at the front end of the second pad extending across the width of the second pad.

30. The caliper gauge of claim 29, further comprising electromagnetic proximity sensing means for determining a distance between the first pad and the second pad.

31. The caliper gauge of claim 27, wherein the second side of the second pad further includes a rounded surface at the rear end of the second pad curving away from the sheet contacting surface, the rounded surface extending across the width of the second pad.

* * * * *